United States Patent [19]
Baccei et al.

[11] Patent Number: 5,371,627
[45] Date of Patent: Dec. 6, 1994

[54] RANDOM DOT STEREOGRAM AND METHOD FOR MAKING THE SAME

[75] Inventors: Thomas J. Baccei, Stow; Robert Salitsky, Cambridge, both of Mass.

[73] Assignee: N.E. Thing Enterprises, Inc., Bedford, Mass.

[21] Appl. No.: 964,640

[22] Filed: Oct. 23, 1992

[51] Int. Cl.$^5$ .............................................. G02B 27/22
[52] U.S. Cl. ..................................... 359/462; 359/478
[58] Field of Search ................ 359/462, 478; 351/201, 351/240; 354/112; 283/73, 901; 353/10; 352/86

[56] References Cited

U.S. PATENT DOCUMENTS 4,829,365  5/1989  Eichenlaub ......................... 359/462

OTHER PUBLICATIONS

*Seeing The Light: Optics In Nature, Photography, Color, Vision and Holography*, 1986.
"A Stereoscopic View of Visual Processing Streams", by Christopher W. Tyler, Smith-Kettlewell Eye Research Institute.
"It Isn't a Trick, But It's Magic" (No date).
"The Autostereogram", by Christopher W. Tyler and Maureen B. Clark, Smith-Kettlewell Eye Research Institute (1990).
"Chapter 13-Cyclopean Vision", by Christopher W. Tyler, *Vision & Vision Dysfunction*, vol. 11 Binocular Visition, D. Regan, Ed.
"Cooperative Phenomena In Binocular Depth Perception", by Bela Julesz, vol. 62, No. 1, Jan.–Feb. 1974 Issue.
"The Texton Theory of Vision Sheds Light On How We See", by Bela Julesz and George T. Moffatt, AT&T Bell Laboratories Record, May 1984.
Brochure of N.E. Thing Enterprises—Advertisement for 1992 Calendar.
"Mental Holography: Stereograms Portraying Ambiguously Perceivable Surfaces", by Bela Julesz and Stephen C. Johnson, The Bell System Technical Journal, vol. 47, Dec. 1986, No. 10.
Brochure-Pentica Loves Puzzles, including "Single Image Dot Stereograms'from May/Jun. 1990 Stereo World, and Mar./Apr. 1990 Stereo World article Random Dot Stereograms".
Fax from Scot Morris dated Jun. 25, 1991.
"Stare-Eo, Toy or More?" *Computers and Mining*, vol. 7, No. 4, Dec. 1991.
"Stereo World Triggers Dot Avalanche", *Stereo World*, Jul./Aug. 1991.
"Vivid 3D Technique for Newspapers", *East Side Monthly*, Sep. 1991.
Advertisement-Stare-E-o's Prize Puzzle.
"Comment: The Free Viewing Question, Diverging Mother Nature" by Stephen B. Smith and Dr. Gary J. Williams, O.D.

*Primary Examiner*—Edward K. Look
*Assistant Examiner*—Christopher Verdier
*Attorney, Agent, or Firm*—Sixbey, Friedman, Leedom & Ferguson

[57] ABSTRACT

A random dot stereogram is formed using a novel method from relatively fine pixels. The "dots" of the stereogram are formed from the pixels in diverse shapes and sizes and are measurably more random in particular respects than dots used in the prior art. The dots are constructed in such a manner that they have a greater range of pixel counts per dot and tend to have more sides and a greater range of size counts than do prior art dots. An apparent three-dimensional image is formed on the dot background by shifting groups of dots, with the amount of the shift determining the apparent height of the group of dots. Superior resolution in the apparent height of the dot groups is obtained by assigning the quantum of movement to be significantly less than the size of the dots. The combination of the increased randomization of the dots and the reduction of the quantum of movement (for example, to 1/300 inch) produces a resolution which was not available using prior art methods.

27 Claims, 9 Drawing Sheets

RANDOM DOT STEREOGRAM AND METHOD FOR MAKING THE SAME

A portion of this disclosure contains material in which copyright is claimed by the applicant. The applicant has no objection to the copying of this material in the course of making copies of the application file or any patents that may issue on the application, but all other rights whatsoever in the copyrighted material are reserved.

FIELD OF THE INVENTION

The present invention relates generally to random dot stereograms and to improved methods for making such stereograms.

BACKGROUND OF THE INVENTION

There are many sensory cues which contribute to the human ability to visually perceive depth and distance. Relative size, perspective, atmospheric effects, etc. all contribute, but the most important is stereoscopic vision. It is, in fact, the only visual cue by which we directly perceive depth, as opposed to distance.

Stereoscopic vision is the image perceived by the brain of the two subtly different views received by our two eyes, i.e. the parallax effect. By closing one eye and then the other, people can observe a relative motion of near objects against far objects. In fact the nearer the object the greater is its displacement in the visual field. This displacement is "computed" by the brain, leading to the perception of depth.

The parallax effect can be used advantageously in forming Random Dot Stereograms (RDS), flat images that have the appearance of three dimensions. These stereograms are a fascinating and entertaining diversion. In addition, the process of viewing stereograms may have a relaxing or even therapeutic effect on the human mind. There is limited anecdotal evidence that viewing RDSs may be useful in pain control therapy.

For example, Dual Image Random Dot Stereograms (DIRDS) were disclosed in an article by Professor Paul S. Boyer of Farleigh Dickinson University in Stereo World, March/April 1990, pp. 30-33. As noted in this article, the human brain has a remarkable ability to extract coherent images from otherwise random patterns, and this ability can be used to decode apparent three dimensional images from a DIRDS, constructed from a pattern of random dots in a pair of images.

To construct a DIRDS, one begins with two separate identical random dot pattern images (one for each eye) as shown in FIG. 1A. If one image is observed with one eye and one with the other, and the images are aligned properly, they will combine optically and appear as a flat plane with the original random pattern on it.

To create a depth effect, an area in one of the images, for example a circle, is marked off and all the dots inside this area are moved a very small distance to the side as shown in FIG. 1B. The random pattern of dots in the images masks the resulting difference from detection on casual comparison of the two images. However, if one eye is used to view each of the images, the brain will after some time "decode" the offset of the random dot pattern and process this detected offset as depth information. In the example of FIG. 1B where the shifted area is circular, the viewer will see a circle apparently "floating" in space over the random dot background. Multiple depths can be created by adjusting the distance of movement of the dot groups. In addition to the circle, FIG. 1B also has a square section of dots in the center area of the circle, which have been moved a distance greater than the distance moved by the dots defining the circle. In this way, a square is created which is apparently located at a higher level than the circle (i.e. floating above the circle).

This dual image technique has been implemented in the past using a computer that produces a random dot pattern in which each pixel is randomly selected to be a particular color (e.g. black or white).

It is also possible to create a Single Image Random Dot Stereogram (SIRDS), as disclosed in an article by Dan Dyckman in Stereo World, May/June 1990, pages 12-13. SIRDS are created using a technique which is slightly more subtle but relies upon the same general principle of parallax viewing as the DIRDS. A single image is divided into a number of columns of random dots, each column having a defined width in pixels (e.g. 50 to 200) which determines the "interocular distance" of the image. The first column on the left is purely random. The second one is a reproduction of the first, except that pixels in the selected area are adjusted to implant the hidden pattern shift which will be perceived by the human brain as depth information.

Next, a third column is put in copying the second column, except for selected pixels which, as before, are shifted a bit to the side. This process is repeated until the whole image is completed. Columns one and two form a pair, column two and three form a pair, columns three and four form a pair etc. all the way across the image.

By defining several areas of shift in an appropriate way, it is possible to create an illusion of many different perceived depths.

The viewing of SIRDS and DIRDS is a "skill" which requires that one learn a particular mode of focusing the eyes. Like riding a bicycle, viewing these images requires some practice at first; once viewing has been achieved, however, it is relatively easy for an individual to view a large variety of these images. As an aid to viewing, various techniques can be used with the "Dual Image" technique. One aid is a sheet of opaque material, such as cardboard, placed at right angles to the surface on which the dual images appear, aligned with the space between the images. One eye goes on each side of the cardboard, at the top, allowing each eye to see only one of the images. Another method uses two magnifying lenses (one for each eye) while holding the two images quite close to the eyes. The proximity forces the eyes to separate the images, while the lenses allow them to focus. The cardboard technique does not function with the SIRDS, since there are several pairs of dot groups hidden in a single image. However, magnifying lenses may be useful in viewing SIRDS.

A careful look at any of the objects depicted in three dimensions in a prior art SIRDS will reveal a distinct layering, as in a contour map. The techniques used in the prior art involve placing a specific dot in a specific dot location. That is, the random dots exist in a matrix whose cells are of a specific size. A given cell is either black or white. First, the random dots are created by random coloration of each cell in the matrix. Then, to create the image, selected areas of random dots are shifted by a distance which is a multiple of the matrix cell size. FIG. 2 is a magnified view of a portion of a SIRDS, showing the formation of a conventional random dot pattern.

Given modern printing technology, it would be possible in theory to make these dots very small. In the prior art, the dimension of a dot is used as a quantum of movement for groups of dots, and thus the dimension of a dot determines the apparent distance between possible altitudes in the three dimensional image. Based on this principle, smaller dots would seem to provide greater resolution in created apparent altitudes, and thus impart a high level of smoothing to the contours of three dimensional images in a RDS. For example, widely available laser printers can print at a resolution of 300 pixels per inch. Therefore, the inventors have experimented with the possibility of generating a SIRDS with the desired high resolution merely by reducing the size of the dots. However, the inventors have found that this technique does not produce acceptable results. For example, FIG. 2 is a SIRDS made with dots of reduced size. The image is therefore more detailed, and the contours are somewhat smoother than those in a SIRDS made with larger dots. However, as the dot size is further reduced beyond that shown, the ability of the eye to resolve the individual dots is also reduced. The finer dots look more like a uniform gray, and are very much more difficult to "see". Even at the limiting resolution of 300 DPI which is available on a laser printer, the results are useless for RDS production. The dots cannot be individually resolved by the human eye, and the viewer is thus unable to decode the depth information imprinted in the dot pattern. For this reason, the "dots" in prior art SIRDS are normally printed at a resolution on the order of 80 dots per inch or less, which did not permit high resolution in the perceived heights of the levels in the image, and therefore did not permit a smooth contour image.

As can be appreciated, there has necessarily been a tradeoff in the prior art between SIRDS with large dots and SIRDS with smaller dots. The larger dot SIRDS depict images looking like contour maps, but most people's ocular pattern recognition capabilities permit them to "see" these imprinted three-dimensional images. Smaller dots produce smoother images, but these images are undesirably harder to see, particularly for those with imperfect vision, and tend to appear as a uniform grayness as the dot size is reduced beyond the ability to resolve individual dots. The images made in the prior art with smaller dots may be so difficult to perceive that most people require aids such as magnifying lenses to compensate for the difficulty of resolving the small dot size.

Because of these problems, the prior art techniques of making RDSs were imperfect. The inventors believe that there is a need to form images with a smooth contour, while maintaining a dot size that permits better pattern recognition and resolution by the viewer. Far more pleasing and complex images would then be possible.

SUMMARY OF THE INVENTION

Figure 1A:
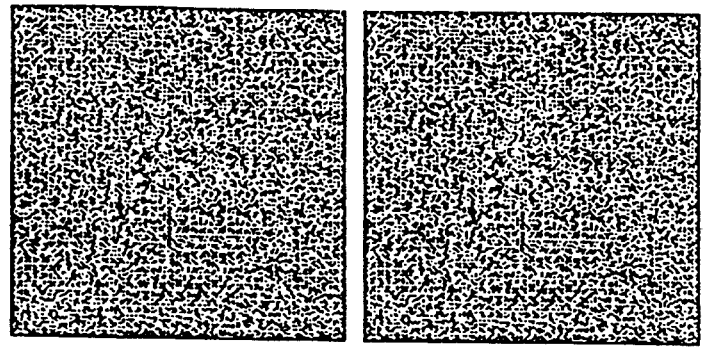
FIG. 1A shows a blank image Dual Image Random Dot Stereogram (DIRDS) according to the prior art.
Figure 1B:
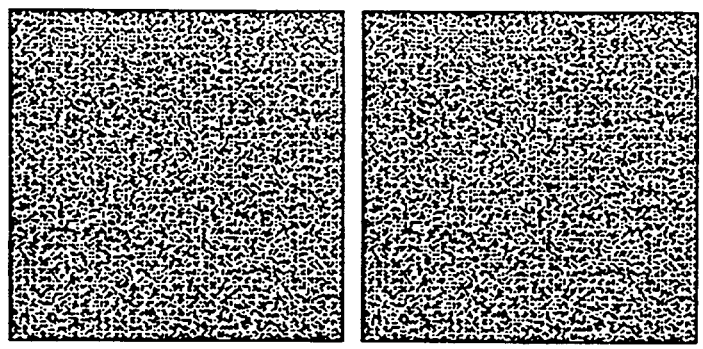
FIG. 1B shows the DIRDS of FIG. 1A modified to produce an apparent three dimensional image of a circle floating over a flat background with a smaller square floating over the circle.

Therefore, it is a general object of the present invention to provide an improved random dot stereogram capable of presenting apparent three dimensional images with relatively smoother contours.

Another broad object of the present invention is to provide an improved method of making random dot stereograms which present apparent three dimensional images with relatively smoother contours than possible in the prior art.

It is another object of the present invention to provide an improved method of making random dot stereograms which can be viewed more easily than prior art stereograms of similar detail level.

A further object of the present invention to provide an improved random dot stereogram which can be viewed more easily than prior art stereograms of similar detail level.

Yet another object of the present invention is to provide an improved method of making a random dot stereogram in which dots are formed using a random walk method.

A further object of the present invention is to provide an improved method of making a random dot stereogram in which dots are formed by randomly selecting a size attribute of each dot in pixels.

Another object of the present invention is to provide an improved method of making a random dot stereogram which provides dots with a greater size distribution range, where size is measured in pixels.

It is also an object of the present invention to provide an improved method of making a random dot stereogram in which apparent height levels can be generated at a high resolution, preferably in excess of 300 pixels per inch.

Still another object of the invention is to provide an improved method of making a random dot stereogram in which the height level resolution or quantum of movement for shifting dot groups is less than the dimensions used to form at least some of the dots.

An additional object of the present invention is to provide an improved method of making a random dot stereogram which provides an increased randomness in the configuration of dots, as measured by any desired algorithm for creating a "randomness" scale.

A further object of the present invention is to provide an improved method of making a random dot stereogram in which the average number of sides per dot is greater than in the prior art.

It is also an object of the present invention to provide an improved method of making a random dot stereogram in which the numbers of sides in dots has a significantly greater range than in the prior art.

A further object of the present invention is to provide an improved random dot stereogram made up of dots formed by randomly selecting a size attribute of each dot in pixels.

Another object of the present invention is to provide an improved random dot stereogram which provides dots with a greater size distribution range, where size is measured in pixels.

It is also an object of the present invention to provide an improved random dot stereogram in which apparent height levels are generated at a high resolution, preferably in excess of 300 pixels per inch.

Still another object of the invention is to provide an improved random dot stereogram in which the height level resolution or quantum of movement for shifting dot groups is less than the dimensions used to form at least some of the dots.

An additional object of the present invention is to provide an improved random dot stereogram which provides an increased randomness in the configuration of dots, as measured by any desired algorithm for creating a "randomness" scale.

A further object of the present invention is to provide an improved random dot stereogram in which the average number of sides per dot is greater than in the prior art.

It is also an object of the present invention to provide an improved random dot stereogram in which the numbers of sides in dots has a significantly greater range than in the prior art.

Further objects of the invention will be apparent to those skilled in the art upon reviewing the specification, claims, and drawings of the invention.

These objects and others are achieved in the present invention by providing a random dot stereogram formed from relatively fine pixels. A method is also provided for forming such a stereogram. The "dots" of the stereogram are formed from the pixels in diverse shapes and sizes and are significantly more randomized than the dots of the prior art. The dots are constructed in such a manner that they have a greater range of pixel counts per dot and tend to have more sides and a greater range of size counts than do prior art dots. An apparent three-dimensional image is formed on the dot background by shifting groups of dots, with the amount of the shift determining the apparent height of the group of dots. Superior resolution in apparent height of dot groups is obtained by assigning the quantum of movement to be significantly less than the size of the dots. The combination of the increased randomization of the dots and the reduction of the quantum of movement (for example, to 1/300 inch) produces a resolution which was not available using prior art methods. This process also forms a hidden image that is easier for the human eye to decode than were prior art random dot stereograms.

DETAILED DESCRIPTION OF THE PREFERRED EMBODIMENTS

The present invention relates generally to improved Random Dot Stereograms (RDSs) and to a method of making improved RDSs. These Random Dot Stereograms are generally constructed by forming a random dot background and then shifting the dots to encode the stereogram with simulated depth information which can be decoded by the human optical system. The invention will be described primarily using the example of a method for making a single image RDS (SIRDS), but it will be understood that the disclosed method for forming random dot patterns useful in stereograms is applicable to both SIRDSs and DIRDSs.

According to the present invention, the dots are formed using pixels of a display medium, such as a printer or display screen. The term "pixel" will be used herein to define the minimum matrix cell available for display on the printer, display screen, or other display device used to display a Random Dot Stereogram (RDS), which is used effectively in the formation of dots. That is, a pixel is the smallest display element of the display device which is independently selected to form dots. The term "dot" will be used herein to define a contiguous grouping of pixels of a single color, with each pixel joined by a side thereof to another pixel in the dot. However, a dot may generally not be considered to include another dot unit which has been arbitrarily connected to the first dot only by a thin (e.g. single pixel width) "spider web line."

In one aspect, the present invention relies upon an expansion of the view of a "dot" which was prevalent in the prior art. In the method according to the prior art, the random dot background pattern was generated by randomly selecting each pixel to be one of (usually two) colors (e.g. black and white). Dots were generally square (or accidentally rectangular etc. based on contiguous dots being coincidentally the same color), and of roughly the same size. The present invention intentionally creates dots with a far greater range of shapes and sizes, and determines their placement not at the dot boundary as a quantum of movement, but instead uses as a quantum of movement the minimum pixel size of the printing medium.

Figure 4:
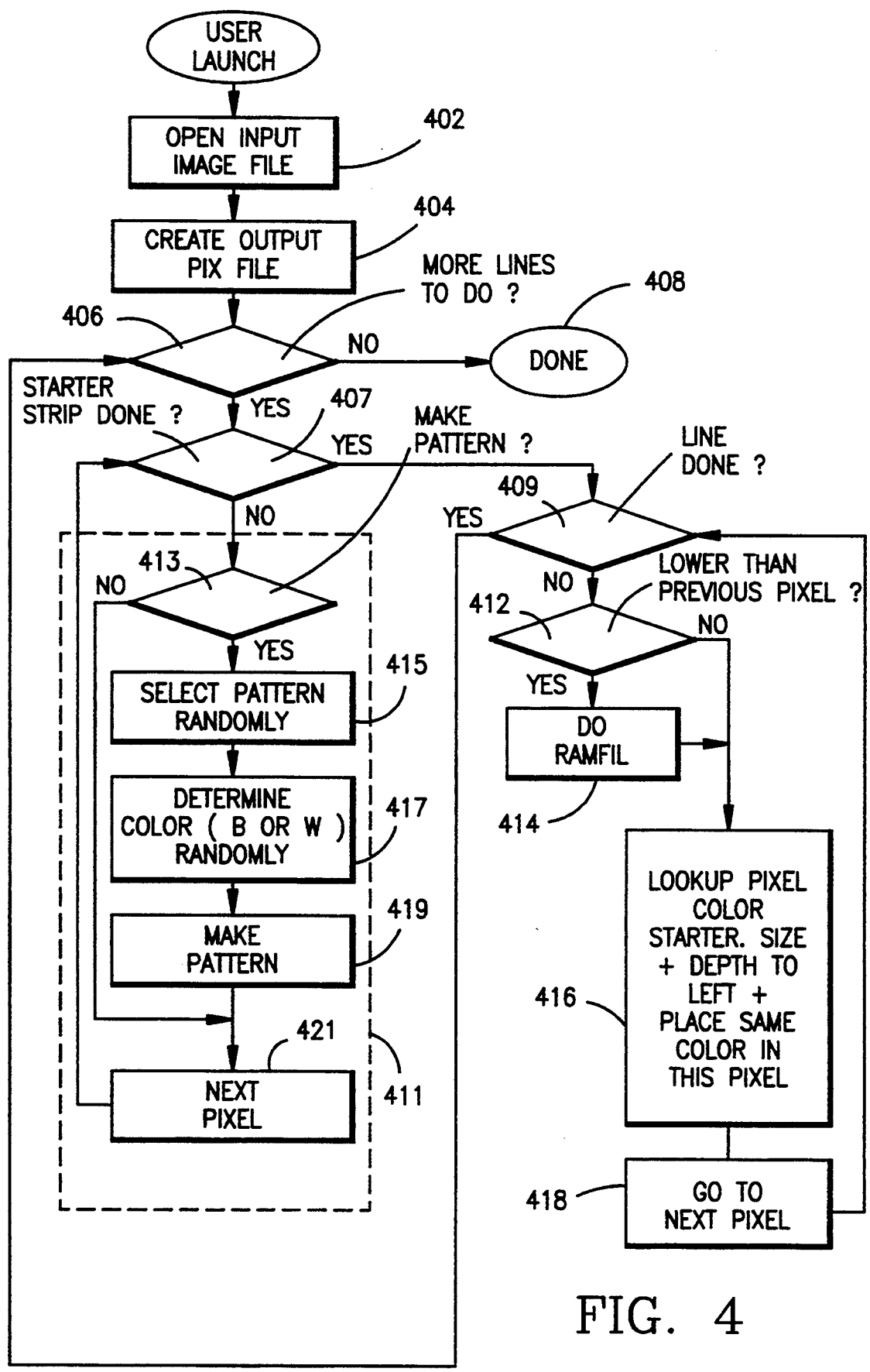
FIG. 4 is a flow chart showing a process according to the present invention for making a single image random dot stereogram (SIRDS) using a computer.

FIG. 4 is a flowchart showing the steps in a computer program which is one preferred method of making the random dot stereograms according to the present invention. The program is designed to efficiently generate each line of image data sequentially. A "starter strip" of random dots is created and then automatically replicated as processing moves across the image. After the dots are formed, they are then shifted according to predetermined desired apparent heights for each area of the drawing.

The shift information is created according to a master height table which defines the height of the desired image in pixel by pixel fashion. Thus, the data in the height table vary depending on the desired image. Therefore, an initial step in the method, as shown at block 402 of the flow chart, is to open an image input file to read this height data defining the image to be produced.

The next step in this preferred method is to open an output PCX file as shown in block 404. A PCX file is a standardized image file format used to store digitized image data. A large number of commercially available software programs work with this standard file structure. In the preferred method, the PCX file is used to store the created SIRDS, which can then be printed, displayed or modified as desired using the computer system. The image could also be printed or displayed directly if so desired.

In block 406, the method evaluates whether the image creation task is complete, i.e. whether there are more lines to be completed. If there are more lines, operation of the program continues at block 407; otherwise, execution ends at block 408.

In block 407, the program determines whether generation of the "starter strip" of the interocular width has been completed. If so, the generation of random dots is bypassed and execution continues pixel-by-pixel beginning with block 409, for assignment of height of the pixel being processed. If not, a novel random dot generation algorithm 411 is performed which generates a random pattern incorporating the pixel.

Random pattern generation algorithm 411 operates generally pixel-by-pixel along each line of the starter strip, using a random process which first randomly determines whether a pattern will be formed and then randomly determines the characteristics of the pattern. Random pattern generation algorithm 411 begins by assigning a 50% probability that a pattern will be made, in block 413 of the flowchart. If the random selection in block 413 determines that no pattern should be made, the random pattern generation algorithm 411 moves on to the next pixel in the line to perform the same function. If this random selection in block 413 determines that a pattern should be made, execution continues at block 415.

In block 415, the type of pattern to be generated is computed randomly. In the preferred embodiment, square patterns can be generated, of dimension one, two, or three pixels on a side. The dimension of the side is determined randomly, with the maximum possible dimension preferably being variable and controllable by an input variable in the depth information file. Other random patterns in addition to squares are possible. What is important is that a group of predetermined possible patterns be formed and that one of these group of patterns is randomly selected when the algorithm determines that a pattern is to be formed. Variation in size of the patterns is desirable since this pattern size variation increases the randomness of the resulting random dot pattern.

Next, in block 417, the color of the pattern to be generated is determined randomly. Generally, it is preferred that the color be selected from the group consisting of black and white. However, a variety of colors could be used, so long as the colors selected can be effectively resolved against each other by the eye of the viewer.

Figure 9:
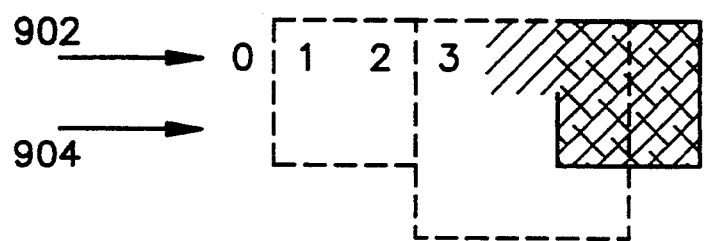
FIG. 9 is a diagram showing a series of patterns created by a preferred program according to the present invention in the course of generating a random dot background pattern.

In block 419, the pixels of the image being generated are changed in color, to the extent the pixels were not already so colored, to conform to the pattern which has been randomly selected. In block 421, execution continues This color change method is illustrated in FIG. 9. FIG. 9 shows a portion of pixels of a display which have been patterned according to random pattern generation algorithm 411 (shown in FIG. 4) pixel-by-pixel along line 902 according to the random determination shown in Table 1.

TABLE 1

| PIXEL | PATTERN GENERATED | SIZE | COLOR |
|---|---|---|---|
| 0 | no | — | — |
| 1 | yes | 2 | white |
| 2 | no | — | — |
| 3 | yes | 3 | white |
| 4 | yes | 1 | black |

TABLE 1-continued

| PIXEL | PATTERN GENERATED | SIZE | COLOR |
|---|---|---|---|
| 5 | yes | 2 | black |

At pixel 0, of the example in Table 1 and FIG. 9, the random selector determined that no square pattern at all should be made. At pixel 1, a 2×2 pixel square pattern was made in the color white. Thus, pixels 1 and 2 and the pixels immediately therebelow were changed to white from any previous color assignment. At pixel 2, the random selection again dictated that no pattern be made. At pixel 3, a white square of 3×3 pixels was formed. At pixel 4, a black square of one pixel in size was formed, overwriting one of the pixels in the white square formed from pixel 3. Finally, in pixel 5, a black square of 2×2 pixels was formed, overwriting additional squares of the previously generated white pattern of pixel 3. This process continues along the entire pixel line 902, and the program subsequently performs the same process on line 904 below line 902 and on subsequent lines, until the basic random pattern starter strip has been completed, after which the generated random dot patterns are replicated in a manner which will be described below in more detail.

Referring again to FIG. 4, the program executes the random dot generation algorithm 411 only until a starter strip has been generated. Thereafter, the random dots of the starter strip are automatically replicated in identical strips across the image area as further lines of the RDS are generated.

When the starter strip has been generated, control passes to block 409. Generally, in a linewise manner, each pixel is shifted appropriately to produce the desired apparent height according to the externally provided desired image data. In block 411, the intended height of the pixel being shifted is checked. As a group of dots are moved, empty space may be left where the dots were located. Two techniques may be used to deal with this problem. One is to put the same dots that would have been in the emptied area back there. That is, rather than "moving" the dots, a "copy" of the dots is prepared and superimposed on the random dot sheet at a slightly shifted location. In this manner, the dots near the edge of the shifted region away from the direction of the shift are maintained in their place and no empty space is created where dots have been removed. This technique gives a good illusion of depth, but creates a distracting aliasing effect. The same local patterns of dots is repeated twice immediately adjacent to each other. On complex images this occurs many times, and creates undesirable image results. Therefore, this method is less preferred.

In the preferred embodiment of the invention, in block 413, the dots in any virtual "Blind Spot" or blank space left at the edge of a dot group being moved are replaced with a fill of new and different random dots. The human brain is quite accustomed to seeing different views from each eye in which each eye sees a small bit of image in the area occluded in the view from the other eye. As a result the new random dots are totally integrated into the perceived image, with no degradation in image quality, and the tendency of complex dot pictures to develop unpleasant aliasing is avoided. Preferably, the same technique used to generate the basic dot pattern is used to fill the zones left blank by the movement of dots to create the apparent three-dimensional image.

In block 415, the required color of the pixel is determined with reference to the desired apparent height of the pixel. The desired apparent height of the pixel will determine an offset which is the distance a pixel should be shifted to provide the desired apparent height at that pixel. The pixel is then colored to match the color of the pixel which lies to one side or the other at a distance equal to the offset away from the pixel. The direction of movement determines whether the pixel appears to be above or below the background.

The process continues for each pixel in the line as shown in block 417 and for each line in the RDS being constructed until the lines are done, at which time control will pass from block 406 to block 408 and the end of the program, rather than continuing in the loop.

A C language program for generating a random dot background according to a preferred embodiment of the method of the present invention is disclosed in the Software Appendix hereto. This program operates to create a standard "PCX" image file defining a SIRDS, using an input file created with a defined format to provide the necessary depth definition information for creation of the SIRDS.

Figure 5:
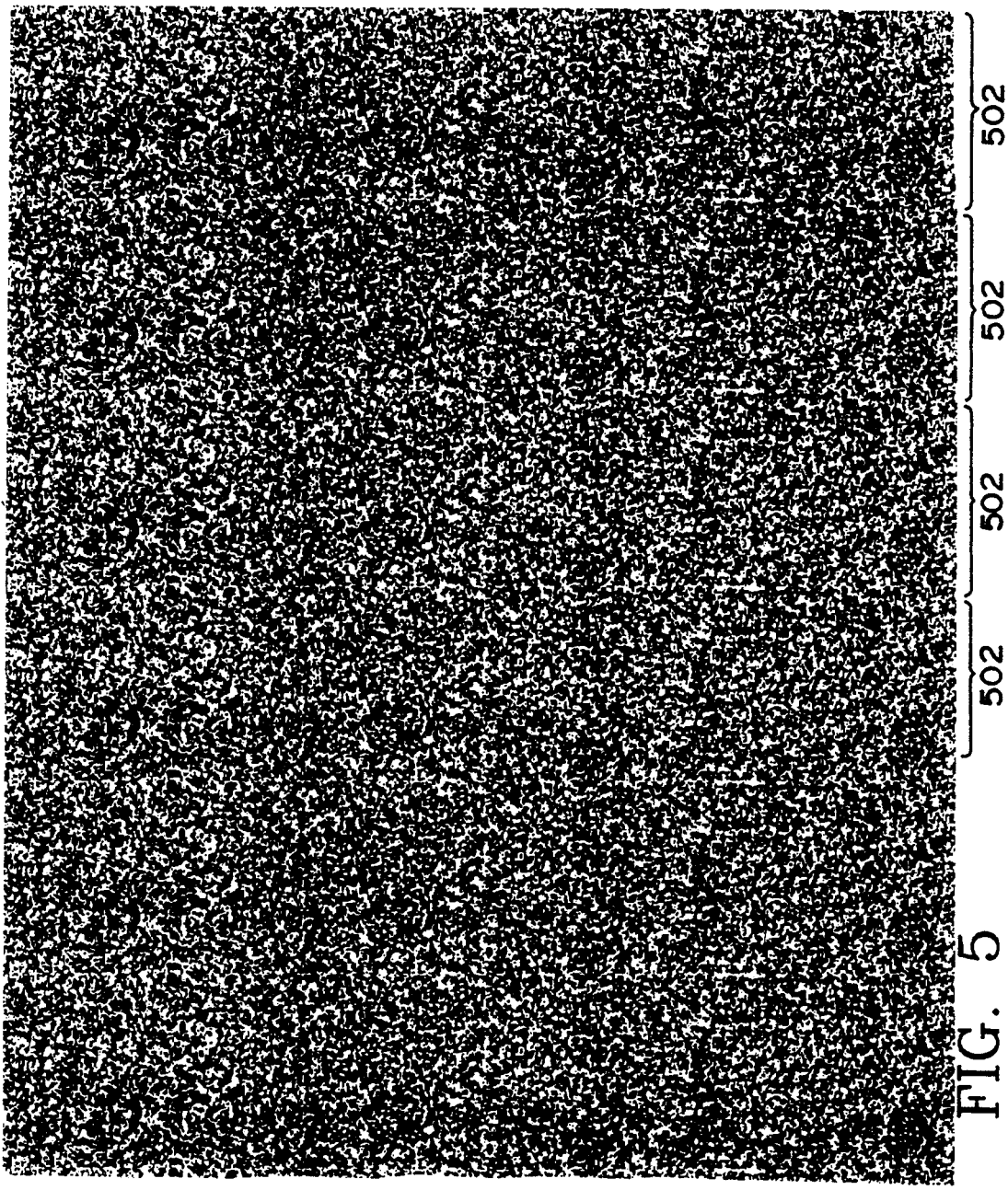
FIG. 5 shows a sample random dot pattern formed according to the present invention for use in making a RDS.

To generate a Single Image Random Dot Stereogram (SIRDS), the strip of random dots may be generated according to the method just described, and this strip is then repeated across the display medium. A sample random dot pattern consisting of multiple strips 502 is shown in FIG. 5. In the random dot pattern of FIG. 5, no "image" has been encoded, and each repeat of the strip 502 is therefore the same. The width of the random dot pattern replicated determines the interocular distance for the image. Preferably, the interocular distance of the image is maintained at about 0.5 inches to one inch. For a 300 pixel per inch display, the width of the replicated random dot pattern strips would therefore be 150 to 300 pixels. Larger interocular distances tend to be more difficult to view. However, the maximum number of apparent altitudes that can be defined is limited by the number of pixels across the random dot pattern strip. The frequency of repeating images across the RDS should also be considered in determining the interocular distance, since RDSs may suffer from an aliasing effect if the frequency of items in the image is close to the interocular distance. Therefore, the number of pixels needed across the width of the random dot pattern strip is selected with regard to general parameters, sometimes with specific adjustment for the particular image being created.

Figure 2:
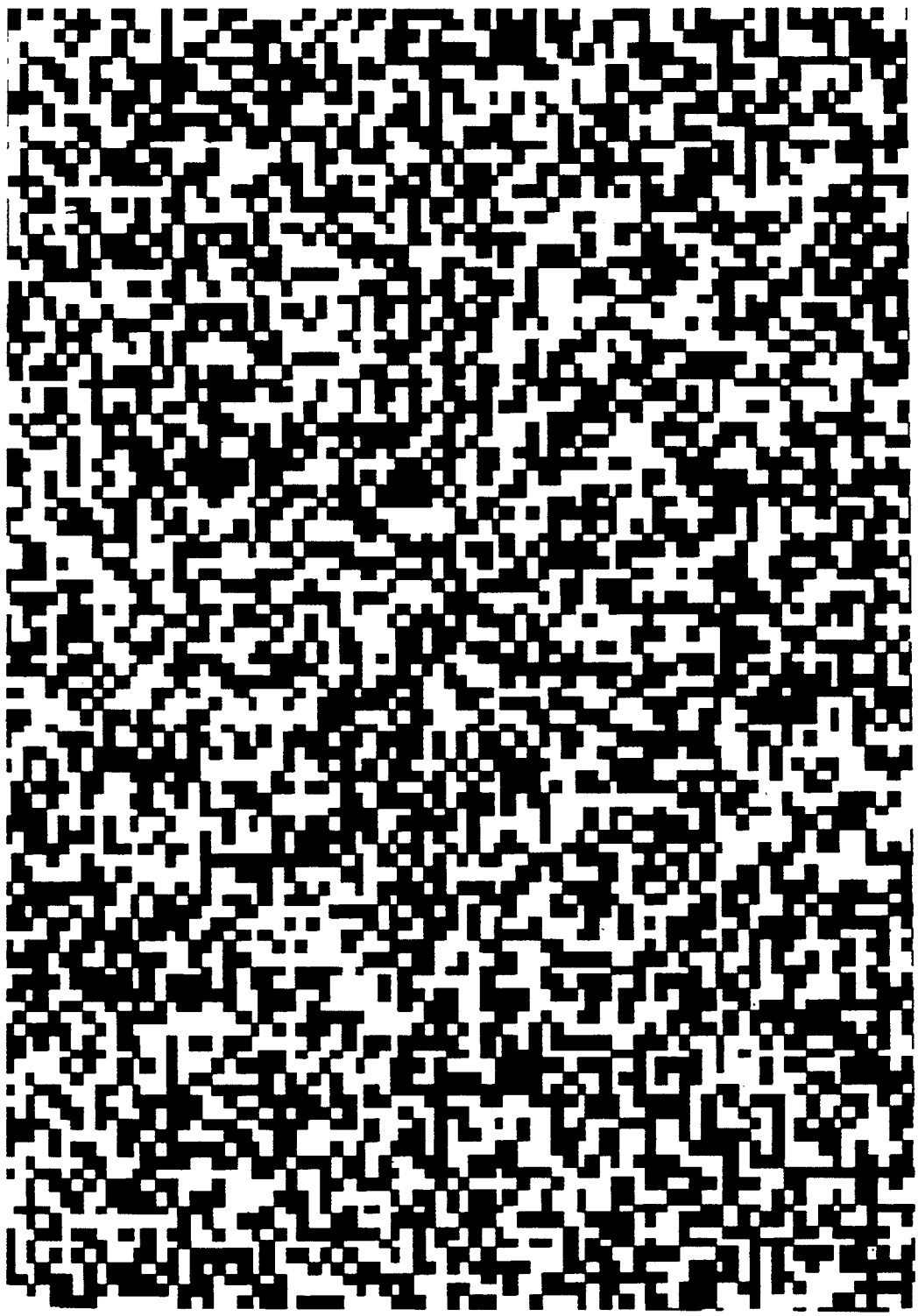
FIG. 2 is a magnified view of a prior art SIRDS made in the conventional manner.
Figure 3:
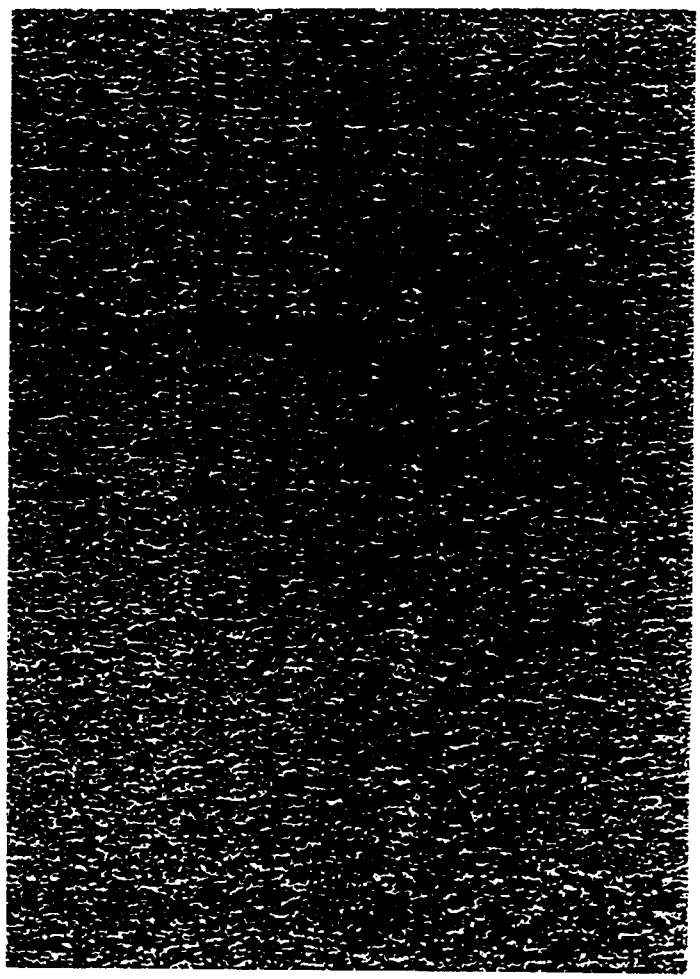
FIG. 3 is a prior art SIRDS made with reduced sized dots.
Figure 6:
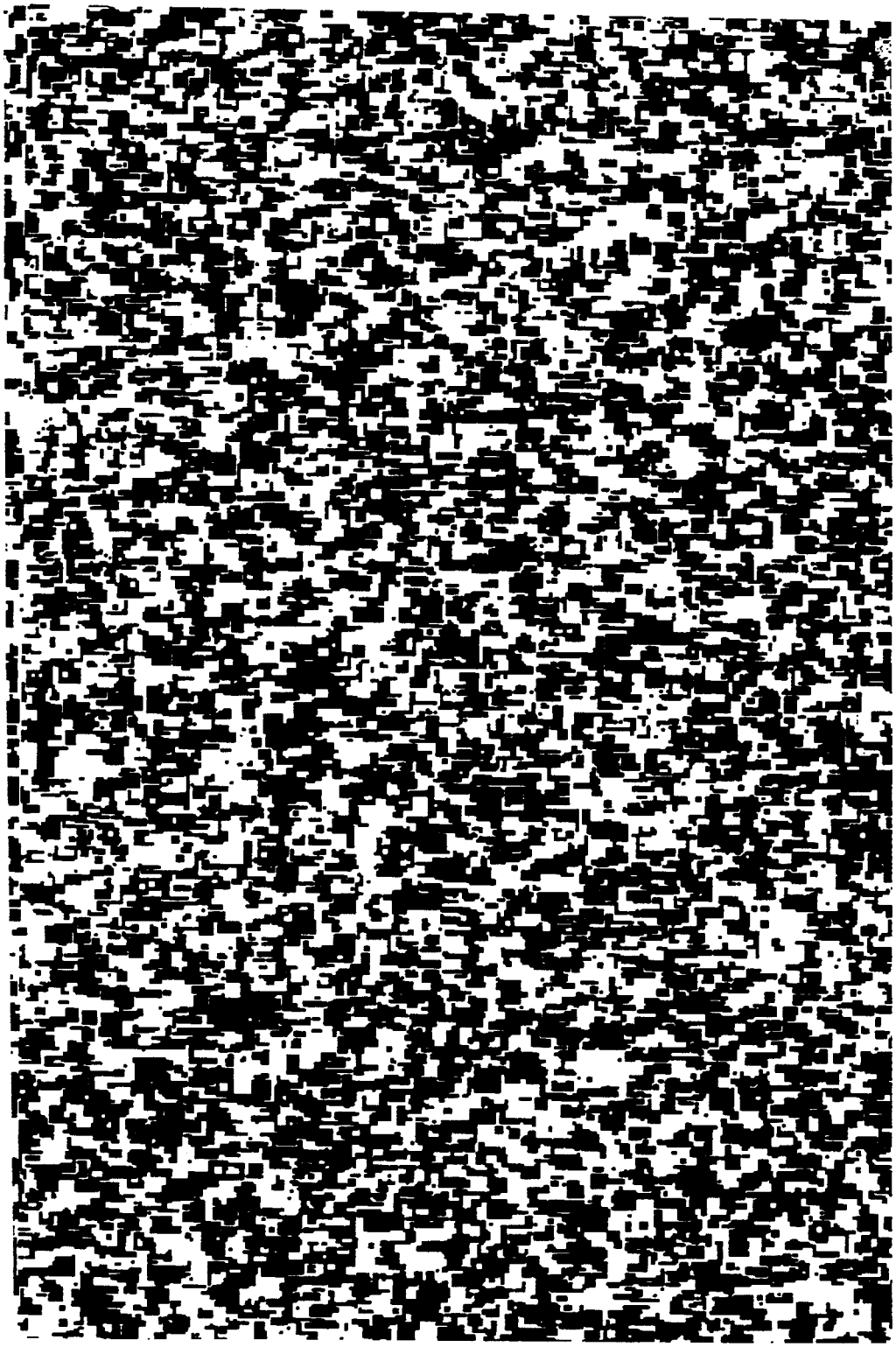
FIG. 6 is a magnified view of a random dot pattern formed according to the present invention for use in making a RDS.

FIG. 6 is an enlargement of a random dot pattern according to the present invention, which is a random dot pattern of the type shown in FIG. 5. The enlargement of FIG. 6 can be contrasted with the prior art random dot pattern enlargement shown in FIG. 2. Upon inspection, significant differences in the characteristics of the dot pattern can be noted. In general, the dots of the present invention as shown in FIG. 6 are more highly randomized than are the dots of the prior art as shown in FIG. 2. Specifically, the dots are more random in their shape, number of sides, size, and separation. To provide a more definite specification of the difference in randomness between the dots of the prior art and the dots of the present invention, it would be possible to construct an arbitrary measure of randomness, which might incorporate any measures desired, for example the distribution of dot shapes, number of sides on the dots, size of the dots measured in pixels, and/or variation in separation of the dots. This arbitrary measure of randomness ("randomness index") could then be used to mathematically define the level of randomness of the dots, and thereby provide a means of distinguishing between the improved randomized process of the present invention and the prior art processes.

Considering a "dot" as defined previously, it can be seen that the prior art random dots of FIG. 2 tend to have fewer sides than the random dots according to the present invention as shown in FIG. 6. An empirical analysis could be conducted to identify the particular statistical differences in the number of sides of dots between the present invention and the prior art. The differences in the range, deviation, and average number of sides are significant and provide one manner of uniquely defining the RDS according to the present invention.

Figure 8:
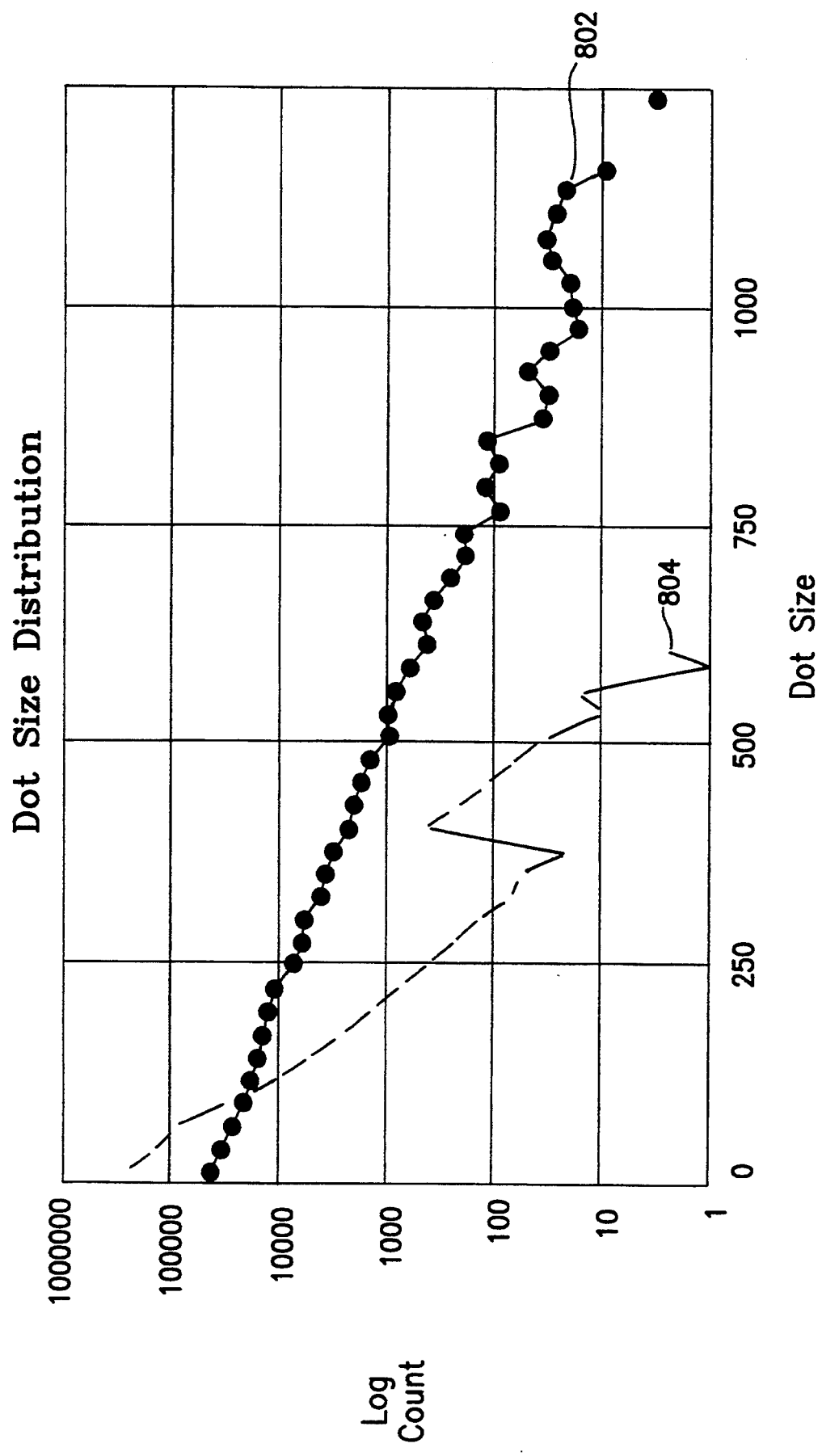
FIG. 8 is a comparative graph showing the logarithmic distribution of dot sizes in the RDS according to the present invention and according to the prior art.

Also, the prior art random dots of FIG. 2 tend to have fewer pixels therein than do the dots according to the present invention as shown in FIG. 6. FIG. 8 is a graph of the dot size distribution for a 1442×970 random dot pattern formed by the method according to the present invention, and for a similar random dot pattern formed according to the prior art method of individually randomly selecting the color of each pixel. Referring now to the graph of FIG. 8, curve 802 is an empirical measurement of the count of dots having the number of pixels indicated on the x-axis, in a 1442×970 pattern according to the present invention. Curve 804 shows the count of dots of the indicated number of pixels in an identical-sized pattern formed by the prior art method. The y-axis, defining the number of dots in the 1442×970 matrix having the specified number of pixels, is provided with a logarithmic scale.

As can be seen, the prior art method depicted by curve 804 has predominantly smaller dots, and also more dots. At the lower end of dot size, the prior art method has many more small dots, e.g. dots having only one or a few pixels, than does the method according to the present invention. At the higher end of dot size, the prior art method has relatively fewer dots of large size, and the maximum dot size is more limited in the prior art method. In fact, the prior art method produces almost no dots having more than 650 pixels. The method of the present invention also produces a broader range and distribution of dot sizes, from one pixel to over 1000 pixels, as can be seen by inspection of curve 802.

It is also possible within the scope of the invention to connect all or a number of the dots using spider lines. That is, very thin lines (e.g. one pixel width) could be drawn to connect many of the individual dots formed in the random pattern. Taken to an extreme, all of the dots could be connected so that by the definition established above, there is only one dot on the whole sheet. Such interconnection does not change the essential increased randomness of the dot patterns which is an important feature of the invention, but this interconnection does artificially modify the number of dots, the sizes of dots, and the distribution of the dots, so that quantitative measures of randomness might not accurately gauge the randomness of the dots. However, a random dot pattern which is artificially interconnected in this manner is a functional equivalent in every way of the random dot pattern according to the present invention.

To encode simulated depth information into the random dot pattern of FIG. 5, an area of dots is defined and all of the dots in this area are shifted some defined number of pixels to one side. The number of pixels the area is shifted determines the apparent height of that area in the RDS image. Multiple layers of depth are achieved by moving regions of dots by differing numbers of pixels to produce different apparent depths. The grouping of dots to be moved by different numbers of pixels is determined by the desired image. Significantly, the method according to the present invention provides a much higher resolution in the apparent depths of the image produced than was available in the prior art. In the prior art, dots could not be formed from individual pixels at a resolution of 200 pixels per inch or more, and certainly not at a resolution of 300 pixels per inch, because the dots would appear as an indistinguishable gray mass when viewed with the naked eye. Dots were instead formed at a lower resolution, such as from individual pixels at about 80 pixels per inch. If higher resolution was available on the display mechanism, such as a laser printer or screen, the higher resolution was not used. If 300 pixels per inch were available, for example, each dot would be formed from a square group of pixels four or five on a side so that a lower resolution of about 80 pixels per inch could be attained. The quantum of movement for shifting of these dots was the width of the dot; therefore the resolution of the apparent height was limited to the width of the dots, which might be about 0.0125 inches.

In the method according to the present invention, the random dots formed as the basis for the RDS may be shifted using a minimal quantum of movement equal to the minimum resolution unit of the display device. Thus, even if a dot is formed from a square group of pixels and has dimensions of 5 pixels by 5 pixels, such dots may be shifted a single pixel to the left, to produce a very slight increase in apparent height of the area occupied by the dots. Further, all of the dots in the RDS may be shifted any integral number of pixels to the side. As noted above, the pixel is the smallest controllable unit of display. Therefore, the apparent height resolution of the method according to the present invention is one pixel, a significant improvement over the prior art. When a device that prints or displays 300 pixels per inch is used for the RDS, an exceptionally smooth apparent contour can be produced in the image, rather than an apparent "stepped" or "contour map" contour.

Figure 7:
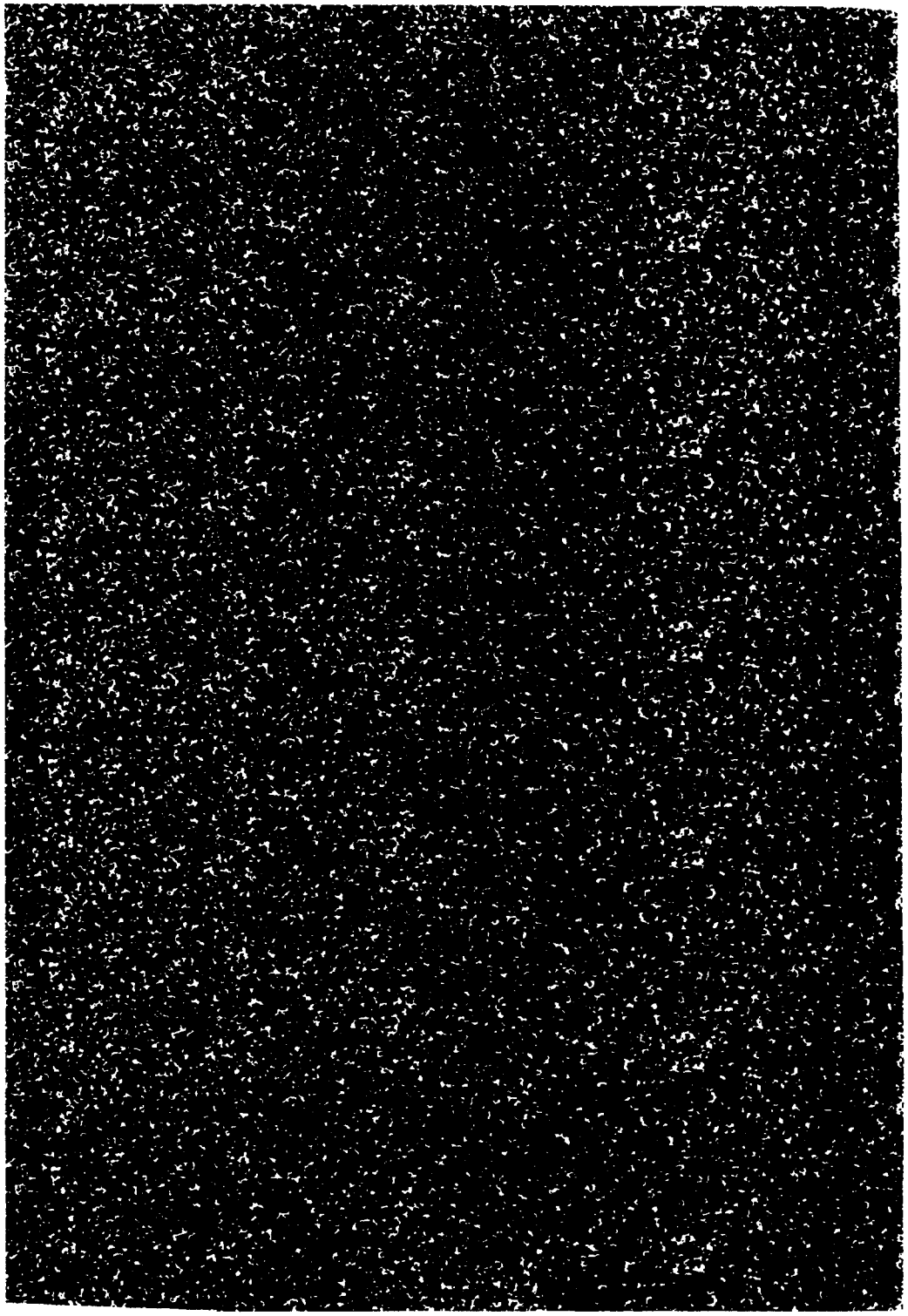
FIG. 7 is a SIRDS made according to the present invention encoded with depth information defining a three-dimensional dinosaur.

FIG. 7 is a "dinosaur" image made using the technique shown in the flow chart of FIG. 4. As can be seen, the smoothness of contour and solidity in the depicted object reflect a substantial advance in RDS techniques. At the same time, the graininess of the image is the same as, or even greater than that found in the older state of the art pictures, which makes the image easier for the human eye to decode. Most people find that they can view this image with increased ease compared to the prior art images.

We claim:

1. A random dot stereogram having encoded therein a visually perceptible apparent three-dimensional representation, comprising:

display support means for providing a substantially planar viewing region suitable for display of the random dot stereogram to a human eye;

an image encoded on said display support means made up of pixels arranged in rows and columns of a matrix array, each pixel having a color which is one of at least first and second contrasting colors;

wherein said pixel colors are encoded to produce at least two identical random dot sets, each set including a plurality of randomly disposed and irregularly shaped dots formed on said display support means, the majority of said dots including a plurality of said pixels; and with a plurality of contiguous groups of said pixels in a first of said random dot sets on said display support means shifted in a direction along a line extending between said group of pixels and an identical group of pixels located in a second of said random dot sets to encode information into said image so that human vision comparing said first and second random dot sets perceives the shift of said pixel groups as depth information which defines said apparent three-dimensional representation; and wherein a distance of said shifts determines a perceived depth of said representation and said pixel groups are shifted by different distances to produce different perceived depths, the distance of said shifts being an integral multiple of a width of a single said pixel, said pixel width being less than or equal to 1/200 inch, whereby said three-dimensional representation can be produced with a plurality of apparent depths to form a high resolution image.

2. The random dot stereogram of claim 1 wherein the random dot stereogram is a single image random dot stereogram having a plurality of said random dot sets and said pixel width is less than or equal to 1/300 inch.

3. The random dot stereogram of claim 1 wherein the random dot stereogram is a dual image random dot stereogram comprising two images, each having substantially identical random dot sets therein in the absence of said pixel shifts, and said pixel width is less than or equal to 1/300 inch.

4. The random dot stereogram of claim 1 wherein said random dots are formed using a method in which multiple adjacent pixels in a randomly selected one of a plurality of predetermined patterns are assigned the same color.

5. The random dot stereogram of claim 4 wherein said color of said pattern of pixels is assigned randomly.

6. A random dot stereogram having encoded therein a visually perceptible apparent three-dimensional representation, comprising:

display support means for providing a substantially planar viewing region suitable for display of the random dot stereogram to a human eye;

an image encoded on said display support means made up of pixels arranged in rows and columns of a matrix array, each pixel having a color which is one of at least first and second contrasting colors;

wherein said pixel colors are encoded to produce at least two identical random dot sets, each set including a plurality of randomly disposed and irregularly shaped dots formed on said display support means, at least some of said dots formed using a predetermined pattern of a plurality of said pixels, said predetermined pattern having width and height dimensions;

wherein a plurality of contiguous groups of pixels in a first of said random dot sets are shifted in a direction along a line extending between said group of pixels and an identical group of pixels located in a second of said random dot sets to encode information into said image so that human vision perceives the shift of said pixel groups relative to said identical group in said second random dot set as depth information which defines said apparent three-dimensional representation; and wherein a distance of said shifts determines a perceived depth of said representation and said pixel groups are shifted by different distances to produce different perceived depths, the distance of all said shifts being a multiple of a width of a single said pixel, with at least one said pixel group shifted by a distance less than said width of said predetermined pattern used in forming the dots, whereby said three-dimensional representation can be produced with a plurality of apparent depths to form a high resolution image.

7. The random dot stereogram of claim 6 wherein the random dot stereogram is a single image random dot stereogram having a plurality of said random dot sets and said pixel width is less than or equal to 1/300 inch.

8. The random dot stereogram of claim 6 wherein the random dot stereogram is a dual image random dot stereogram comprising two images, each having substantially identical random dot sets therein in the absence of said pixel shifts, and said pixel width is less than or equal to 1/300 inch.

9. The random dot stereogram of claim 6 wherein said random dots are formed using an iterative method in which multiple adjacent pixels in a randomly selected one of a plurality of different predetermined patterns are assigned the same color.

10. The random dot stereogram of claim 9 wherein said color of said pattern of pixels is assigned randomly.

11. A random dot stereogram having encoded therein a visually perceptible apparent three-dimensional representation, comprising:
display support means for providing a substantially planar viewing region suitable for display of the random dot stereogram to a human eye;
an image encoded on said display support means made up of pixels arranged in rows and columns of a matrix array, each pixel having a color which is one of at least first and second contrasting colors;
wherein said pixel colors are encoded to produce at least two identical random dot sets, each set including a plurality of randomly disposed and irregularly shaped dots formed on said display support means, each dot formed from a varying number of pixels of the first color such that the statistical range of the number of pixels per dot in the random dot set is greater than 750;
such that a plurality of contiguous groups of pixels in a first of said random dot sets are shifted in a direction along a line extending between said group of pixels and an identical group of pixels located in a second of said random dot sets to encode information into said image so that human vision perceives the shift of said pixel groups relative to said identical groups located in said second random dot set as depth information which defines said apparent three-dimensional representation.

12. The random dot stereogram of claim 11 wherein the random dot stereogram is a single image random dot stereogram having a plurality of said random dot sets and said pixel width is less than or equal to 1/300 inch.

13. The random dot stereogram of claim 11 wherein the random dot stereogram is a dual image random dot stereogram comprising two images, each having substantially identical random dot sets therein in the absence of said pixel shifts, and said pixel width is less than or equal to 1/300 inch.

14. The random dot stereogram of claim 11 wherein said random dots are formed using a method in which multiple adjacent pixels in a randomly selected one of a plurality of predetermined patterns are assigned the same color.

15. The random dot stereogram of claim 14 wherein said color of said pattern of pixels is assigned randomly.

16. A method of making a random dot stereogram having encoded therein a visually perceptible apparent three-dimensional representation, comprising the steps of:
providing a display support means for providing a substantially planar viewing region suitable for display of the random dot stereogram to a human eye, operating to display an image made up of pixels arranged in rows and columns of a matrix array, each pixel having a color which is one of at least first and second contrasting colors;
generating at least two substantially identical random dot sets each set including a plurality of randomly disposed and irregularly shaped dots formed on said display support means by randomly assigning color to selected variably sized patterns of pixels on the display support means in an iterative process, with at least some of said patterns consisting of more than one pixel; and
shifting a plurality of contiguous groups of pixels in a first of said random dot sets in a direction along a line extending between said group of pixels and a corresponding substantially identical group of pixels located in a second of said random dot sets to encode information into said image so that human vision compares said first and second random dot sets and perceives the shift of said pixel groups relative to said identical group of pixels in said second random dot set as depth information which defines said apparent three-dimensional representation.

17. The method of claim 16 wherein the pixels are shifted to encode the image during the process of making the random dot patterns.

18. The method of claim 16 wherein the pixels are shifted by different distances to produce different perceived depths, the distance of said shifts being an integral multiple of a width of a single said pixel, said pixel width being less than or equal to 1/200 inch, whereby said three-dimensional representation can be produced with a plurality of apparent depths to form a high resolution image.

19. The method of claim 18 wherein the stereogram formed is a single image random dot stereogram having a plurality of said random dot sets and said pixel width is less than or equal to 1/300 inch.

20. The method of claim 18 wherein the stereogram formed is a dual image random dot stereogram comprising two separated images, each having substantially identical random dot sets therein in the absence of said pixel shifts, and said pixel width is less than or equal to 1/300 inch.

21. The method of claim 16 wherein said patterns of pixels are determined by randomly selecting a group of proximate pixels to have the same color.

22. The method of claim 21 wherein said patterns are selected randomly from a predetermined group of patterns.

23. The method of claim 22 wherein said predetermined group of patterns includes a null pattern which does not color any pixels.

24. The method of claim 22 wherein said color of said predetermined pattern of pixels is assigned randomly.

25. The method of claim 24 wherein a plurality of said patterns are formed on at least some of the pixels, with such multiply-patterned pixels being assigned the color of the last pattern applied to said pixel.

26. The method of claim 25 wherein said patterns are formed by the further steps of:

row-wise scanning the pixels in a predetermined area, and for each pixel, randomly determining a pattern, if any, to be formed based on that pixel, at least some possible patterns affecting a plurality of proximate pixels;

randomly determining the color of said pattern to be formed based on that pixel;

changing the color of the pixel if applicable and any proximate pixels affected by said pattern;

continuing said row-wise scanning of pixels until generation of the random dots is complete.

27. The method of claim 26 wherein the possible patterns from which a pattern is selected include a plurality of differently sized squares, each having dimensions of n pixels by n pixels, where n is an integer.

* * * * *